United States Patent [19]

Pinault

[11] Patent Number: 5,913,175

[45] Date of Patent: Jun. 15, 1999

[54] METHOD OF MAKING THE USE OF A TERMINAL OF A CELLULAR MOBILE RADIO SYSTEM MORE SECURE, AND CORRESPONDING TERMINAL AND USER CARD

[75] Inventor: Francis Pinault, Bois Colombes, France

[73] Assignee: Alcatel Mobile Phones, Paris, France

[21] Appl. No.: 08/777,734

[22] Filed: Dec. 20, 1996

[30] Foreign Application Priority Data

Dec. 21, 1995 [FR] France .................................. 95 15283

[51] Int. Cl.⁶ ...................................................... H04Q 7/32
[52] U.S. Cl. ........................... 455/558; 455/410; 455/411
[58] Field of Search ..................................... 455/410, 411, 455/557, 558; 379/114, 143, 357; 235/380, 382; 380/21, 28, 30, 23, 3

[56] References Cited

U.S. PATENT DOCUMENTS

| | | | |
|---|---|---|---|
| 4,736,419 | 4/1988 | Roe | 380/23 |
| 5,390,252 | 2/1995 | Suzuki et al. | 455/411 |
| 5,444,764 | 8/1995 | Galecki | 455/558 |
| 5,600,708 | 2/1997 | Meche et al. | 455/411 |
| 5,604,787 | 2/1997 | Kotzin et al. | 455/558 |
| 5,617,470 | 4/1997 | Depasquale | 379/114 |
| 5,661,806 | 8/1997 | Nevoux et al. | 380/25 |
| 5,675,607 | 10/1997 | Alesio et al. | 379/114 |
| 5,742,910 | 4/1998 | Gallant et al. | 455/558 |
| 5,748,720 | 5/1998 | Loder | 455/407 |
| 5,761,624 | 6/1998 | Mooney et al. | 455/558 |

FOREIGN PATENT DOCUMENTS 03 01 740 A2 2/1989 European Pat. Off. .

OTHER PUBLICATIONS

J. K. Omura, "A computer dial access system based on public–key techniques", *IEEE Communications Magazine*, Jul. 1987, vol. 25, No. 7, Jul. 1987, ISSN 0163–6804, pp. 73–79.

*Primary Examiner*—Dwayne D. Bost
*Assistant Examiner*—Jean A. Gelin
*Attorney, Agent, or Firm*—Sughrue, Mion, Zinn, Macpeak & Seas, PLLC

[57] ABSTRACT

A terminal of a cellular mobile radio system cooperates with a user card and is able to operate in at least two separate operating modes, namely a normal mode in which it can be used with any user card and a locked mode in which it can be used only with the user card to which it is locked, the latter constituting a linked user card. To make use of the terminal more secure, first locking data is stored in a memory area of the linked user card and, in the locked mode, the method includes a phase of authentication by the terminal of the user card with which it is cooperating. In the authentication phase second locking data is calculated in the terminal from the intermediate data read in a memory area accessible to the terminal using a calculation function specific to the terminal, and the first and second locking data is compared in the terminal and use of the terminal is authorized only in the event of equality, that is to say if the user card with which the terminal is cooperating is authenticated as the linked user card.

21 Claims, 5 Drawing Sheets

METHOD OF MAKING THE USE OF A TERMINAL OF A CELLULAR MOBILE RADIO SYSTEM MORE SECURE, AND CORRESPONDING TERMINAL AND USER CARD

BACKGROUND OF THE INVENTION

1. Field of the Invention

The field of the invention is that of cellular mobile radio systems with terminals (also called mobile stations). In the field of cellular mobile radio, European standards include the GSM (Global System for Mobile communications) standard, covering public mobile radio systems operating in the 900 MHz band.

To be more precise, the invention concerns a method of making the use of a terminal of a cellular mobile radio system more secure. The method of the invention can be used in a GSM system, but is not exclusive to that system.

2. Description of the Prior Art

A cellular mobile radio system is implemented within a network of geographical cells through which the mobile stations (or terminals) travel. A base station is associated with each cell and a mobile station communicates through the base station of the cell in which it is located.

The expression mobile station or terminal (both of which are used interchangeably in this description) refer to the physical equipment employed by the user of the network to access the telecommunication services offered. There are various types of terminals, such as vehicle-mounted, portable and hand-portable terminals.

When a user uses a terminal, they generally have to connect a user card that they retain in order for the latter to communicate their subscriber number to the terminal. In the case of the GSM system, the user card that the user must connect to the terminal is a removable memory card called the Subscriber Identity Module (SIM), which communicates to the terminal the user's International Mobile Subscriber Identity (IMSI) number.

In other words, all of the personalized information concerning the subscriber is stored on the user card (or SIM card). Thus, in the general case, any terminal can be used with any user card.

An authentication mechanism prevents unauthorized use of the identity of a network subscriber. It must not be possible for a person knowing only the identity (or IMSI) of a subscriber to pass themselves off as that subscriber to the network. To this end, the user card also contains an individual authentication key and an authentication algorithm. After the subscriber has identified himself or herself, the network can therefore check their identity and break off the procedure if the authentication procedure fails.

Subscribers may inform the network operator or manager that their card has been lost or stolen. This means that any attempt by a third party to use their user card can be detected and barred at system level.

The operator often offers an additional degree of protection of the user card. For this, a Personal Identity Number (PIN) is stored on the user card. Subscribers are asked to enter their PIN code on the keypad of the terminal each time the card is inserted into the terminal or each time that the terminal is switched on. This prevents anyone using a lost or stolen user card if they do not know the PIN code associated with that user card.

Although in the early days of cellular mobile radio systems various means of protecting user cards against unauthorized use were proposed, as explained above, the same cannot be said in respect to protection of the terminals. First generation terminals do not have any particular protection against unauthorized use. Consequently, a lost or stolen terminal can be used by anyone holding a valid user card. The network verifies the validity of the user card but not that of the terminal. In protection terms, the terminal can therefore be classified as "passive".

Each terminal of a cellular mobile radio system is a costly device, whether the cost is met by the subscriber or by the operator. There is therefore an obvious benefit in attempting to make its use more secure, in particular in the event of loss of theft.

Making the use of a terminal more secure generally consists in proposing, in addition to the normal operating mode, a so-called locked mode in which the terminal can be used only with a user card with which it is "locked", called the linked user card. In other words, a link is established between the terminal and a particular user card (the linked user card).

One technique for implementing a locked mode of this kind is described in patent U.S. Pat. No. 4,868,846, assigned to NOKIA MOBILE PHONES LTD. The method described in the above patent includes a phase of creating a terminal/user card link and a phase of verifying the terminal/user card link.

In the link creation phase, the terminal reads the user identification data stored on the user card and stores it in its memory.

During the link verification phase the terminal reads the user identification data stored on the user card with which it is cooperating and compares it with that stored in its memory during the link creation phase, authorizing operation of the terminal or not according to whether the data read and that stored are identical or not.

This prior art technique therefore prevents a terminal being used with a user card other than that with which it has been locked. This prevents unauthorized use of a terminal lost or stolen without its linked user card. This contributes to reducing the number of terminal thefts.

Note that even if the terminal is lost or stolen with its linked user card, it can be used only with the latter. As already explained, the subscriber can tell the operator that their user card has been lost or stolen, so that its use can be barred at system level. Stealing the terminal is therefore of no benefit in this case either.

This prior art technique of making the use of a terminal more secure nevertheless has at least two major drawbacks.

Firstly, it does not totally eliminate all risks of unauthorized use of the terminal. The terminal/user card link is based on the storage in the memory of the terminal of the user identification data (read by the terminal from the user card during the link creation phase). There is nothing to stop a person directly modifying the content of the terminal memory in order to modify the existing locking link. In this case, the identification data of the linked user card is replaced in the terminal memory with new identification data from another user card. In this way, although it is in the locked mode, unauthorized use of the terminal is possible since it sees the other user card as that with which it is linked.

Moreover, this prior art technique is generally combined with protection by requiring subscribers to enter their PIN code each time their user card is inserted into the terminal or each time the latter is switched on. Entering the PIN code can become a nuisance if it has to be carried out many times a day. For this reason, some subscribers leave their terminal switched on in order to avoid having to enter their PIN code several times. Then, even if the locked mode is selected, stealing the terminal when it is switched on and cooperating with its linked user card enables a person to access the services of the network until this is barred at system level after the subscriber has reported the loss of theft of their user card. It must be remembered that, in respect of the use of stolen terminals, there is no barring procedure at system level equivalent to that which exists for stolen user cards.

One objective of the invention is to overcome these drawbacks of the prior art.

To be more precise, one objective of the present invention is to provide a method of making the use of a cellular mobile radio system terminal more secure that completely eliminates all risk of unauthorized use of the terminal.

An additional objective of the invention is to provide a method of the above kind that does not require users to enter their PIN code each time they insert their user card into the terminal or each time they switch the latter on.

A further object of the invention is to provide a method of the above kind that offers not only the advantages offered by the prior art method described in patent U.S. Pat. No. 4,868,846, referred to above, but has additional advantages that cannot be offered by the prior art method.

In other words, one objective of the invention is to provide a method of the above kind which, like the prior art method, allows operation in locked mode in which the terminal can be used only with a particular user card.

A further objective of the invention is to provide a method of the above kind which allows a terminal to be left switched on with its user card inside it but which nevertheless prevents unauthorized use of the terminal, which is not possible with the prior art method.

A further objective of the invention is to provide a method of the above kind enabling local or remote blocking (total prohibition of operation) or unblocking (authorization of operation in locked mode) of a terminal.

Another objective of the invention is to provide a method of the above kind enabling a subscriber having more than one terminal for the same subscription to have at all times at least one terminal providing various "passive reception" functions (answering machine type operation), such as incoming call storage.

SUMMARY OF THE INVENTION

These various objectives, and others that will emerge hereinafter, are achieved in accordance with the invention by a method of making the use of a terminal of a cellular mobile radio system more secure, said terminal being of the type adapted to cooperate with a user card and being able to operate in at least two separate operating modes, namely a normal mode in which it can be used with any user card and a locked mode in which it can be used only with the user card to which it is locked, constituting a linked user card, wherein first locking data is stored in a memory area of said linked user card, and, in said locked mode, the method includes a phase of authentication by said terminal of the user card with which it is cooperating, said authentication phase including the following steps:

second locking data is calculated in said terminal from said intermediate data read in a memory area accessible to said terminal using a calculation function specific to said terminal, and said first and second locking data is compared in said terminal and use of said terminal is authorized only in the event of equality, that is to say if said user card with which said terminal is cooperating is authenticated as said linked user card.

The general principle of the invention is to establish a link between a terminal and a user card by storing locking data on the user card (called the linked user card). This principle is fundamentally different from that proposed in the previously mentioned patent U.S. Pat. No. 4,868,846. Although the prior art principle also establishes a link between the terminal and a user card, it is based on storing locking data in the terminal (and not on the linked user card).

In this way the method of the invention enables operation in locked mode in which the terminal can be used only with the linked user card.

Moreover, it totally eliminates all risks of unauthorized use of the terminal. It is therefore free of the vulnerability of the prior art method. The terminal/user card link is dependent, firstly, on first data stored on the linked user card and, secondly, on a calculation function specific to the terminal. Under no circumstances can an unauthorized user discover this calculation function as it is not accessible in read mode. Moreover, unless the linked user card is stolen with the terminal, the unauthorized user does not know the first data stored either. Consequently, the unauthorized user cannot modify a user card in their possession so that the terminal sees the latter as the user card to which it is linked.

It is clear that, in the manner that is known in itself, if the linked user card is stolen with the terminal the subscriber can advise the network operator or manager so that use of their user card can be barred at system level.

The method of the invention offers operation in locked mode that is sufficiently secure for the user not to need to enter their PIN code again each time that they insert their user card into the terminal or each time that they switch it on.

Said authentication phase is advantageously effected:

each time the terminal is switched on, and/or each time the user card cooperating with the terminal is changed.

The authentication phase can advantageously be repeated in accordance with a predetermined strategy, for example at predetermined time intervals, regular or otherwise.

Said calculation function specific to the terminal is preferably an encryption function using a predetermined algorithm and said first and second locking data are preferably encrypted using this encryption function.

This makes the use of the terminal even more secure.

In a first preferred embodiment of the invention, the step of storing first locking data in a memory area of the linked user card is effected during preliminary personalization of said linked user card.

This preliminary personalization is carried out during fabrication of the user card, for example, during commissioning of the user card (by the manufacturer, operator or distributor) or during the putting together of a personalized system comprising the terminal and its user card. In other words, the user card is personalized either in the factory or by a distributor. In so far as its operation in locked mode is concerned, the user card is therefore linked to a particular terminal as soon as it is personalized, this terminal being the one whose specific calculation function calculates, from intermediate data, second locking data identical to the first locking data stored on the linked user card. In other words, the user card can be locked only to this particular terminal.

In a second preferred embodiment of the invention, the step of storing first locking data in a memory area of the linked user card is effected on each change from the normal mode to the locked mode, new first data to be stored being calculated in the terminal from said intermediate data by said calculation function specific to said terminal.

In this case, the user card is not linked to a terminal beforehand and can therefore be locked to any terminal. It is only on changing from the normal mode to the locked mode that the link with the terminal is created (so that the terminal is that with which the user card is cooperating).

On each change from the locked mode to the normal mode, the content of the memory area of the previously linked user card in which the first locking data is stored is advantageously modified, at least in part, to delete the authentication link between the terminal and the previously linked user card.

This makes it certain that before the next change to the locked mode there is no user card linked to the terminal. In other words, in normal mode no user card holds in its memory any trace of an earlier link with the terminal, and this applies even to the user card that was previously locked to the terminal.

In said locked mode, the terminal can advantageously be used with at least one other user card, referred hereinafter as the other linked user card, in a multi-user session starting after a multi-user code has been transmitted to the terminal and ending either when said other linked user card is no longer cooperating with the terminal or when the terminal is switched off and then switched on again.

In this case, the terminal operates in the locked mode with either of the two linked user cards. When the multi-user session allowing the use of a second linked user card terminates, the system reverts to the link between the terminal and the first linked user card. The linked user card with which the terminal cooperates can therefore be replaced by another user card without it being necessary to go through the normal mode. Consequently, the use of the terminal remains totally secure, even if there are two linked user cards, rather than only one.

Said intermediate data is preferably stored in a memory area of the terminal.

In a first preferred embodiment, said intermediate data is stored in a memory area of a user card with which the terminal cooperates.

In a second preferred embodiment that combines the previous two solutions, part of said intermediate data is stored in a memory area of the terminal and the remainder in a memory area of the user card with which the terminal cooperates.

The step of storing the intermediate data is advantageously effected:

during manufacture of the terminal, in the case of intermediate data stored in a memory area of the terminal, and during manufacture of the user card, in the case of intermediate data stored in a memory area of the user card.

Changing the terminal from the normal mode to the locked mode preferably requires the transmission to the terminal of a predetermined locking/unlocking code and changing the terminal from the locked mode to the normal mode requires the transmission to the terminal of said locking/unlocking code.

This makes use of the terminal even more secure.

Said locking/unlocking code is advantageously entered by a user of the terminal through a keypad connected to the terminal.

In one advantageous embodiment of the invention, in said locked mode, the method further comprises:

a step of blocking of the terminal during which the content of the memory area of the linked user card in which said first locking data is stored is at least partially modified to render the terminal unusable even if the user card with which it is cooperating is the linked user card, and a step of unblocking the terminal during which said first locking data is rewritten into the memory area of the linked user card to render the terminal usable again if the user card with which it is cooperating is the linked user card.

Accordingly, when it is in the locked mode, the terminal can be rendered unusable (complete blocking preventing unauthorized use) without being switched off. In this "switched on but blocked" condition, the terminal can implement various "passive reception" functions (answering machine type operation), such as storing incoming calls.

Said blocking step is preferably effected when a blocking command is transmitted to the terminal and said unblocking step is preferably effected when an unblocking command is transmitted to the terminal.

Accordingly, the method of the invention enables local or remote blocking (total barring of operation) or unblocking (authorization of operation in locked mode) of the terminal.

Said blocking and unblocking commands are advantageously ignored by the terminal unless they are accompanied by a predetermined blocking/unblocking code.

This makes use of the terminal even more secure.

Said blocking and unblocking commands are preferably transmitted to the terminal by means of a Short Messages Service.

In a preferred embodiment, said blocking and unblocking commands are transmitted to the terminal using a Data Transmission Service.

In a preferred embodiment of the invention, said blocking and unblocking commands are transmitted to said terminal, constituting a first terminal, from another terminal, constituting a second terminal, and the user card with which said second terminal cooperates and the user card with which said first terminal cooperates correspond to the same subscription.

Accordingly, the method of the invention enables a subscriber having more than one terminal for the same subscription to have at all times at least one terminal provide an answering machine type service (for example to store incoming calls).

The invention also concerns a terminal and a user card for implementing the method as explained hereinabove.

The terminal of the invention includes means for making its use more secure including:

first means for reading first locking data in a memory area of said linked user card;

second means for reading intermediate data in a memory area accessible to said terminal;

means for calculating second locking data from said intermediate data using a calculation function specific to said terminal;

means for comparing said first and second locking data; and selective authorization means allowing use of said terminal only in the case of equality, that is to say if the user card with which the terminal is cooperating is authenticated as the linked user card.

The user card of the invention includes a memory area to receive first locking data.

Other features and advantages of the invention will emerge from a reading of the following description of various preferred embodiments of the invention given by way of illustrative and non-limiting example and from the accompanying drawings.

BRIEF DESCRIPTION OF THE DRAWINGS

Each of the three pairs of FIGS. (2A, 2B), (3A, 3B) and (4A, 4B) shows a separate implementation of the FIG. 1 authentication phase, with for each pair a separate mode of storing intermediate data, each pair comprising.

a first FIG. 2A, 3A or 4A showing in schematic form the distribution between the terminal and the user card of elements for implementing the method of the invention, a second FIG. 2B, 3B or 4B showing in schematic form the phase of authentication of the user card by the terminal.

DETAILED DESCRIPTION OF THE PREFERRED EMBODIMENTS

The invention concerns a method of making the use of a terminal or a cellular mobile radio system more secure. The terminal is of the type designed to cooperate with a user card and able to operate in at least two different operating modes, namely a normal mode in which it can be used with any user card and a locked mode in which it can be used only with the user to which it is locked, known as the linked user card.

It is therefore necessary to create a link between the terminal and the user card and to authenticate this terminal/user card link in order to prevent the use in the locked mode of a user card other than the linked user card.

In accordance with the invention, the link creation phase consists in storing first locking data in a memory area of the linked user card. As explained in more detail in the remainder of the description, this creation phase can be carried out either during manufacture of the user card or on each change from the normal mode to the locked mode.

Figure 1:
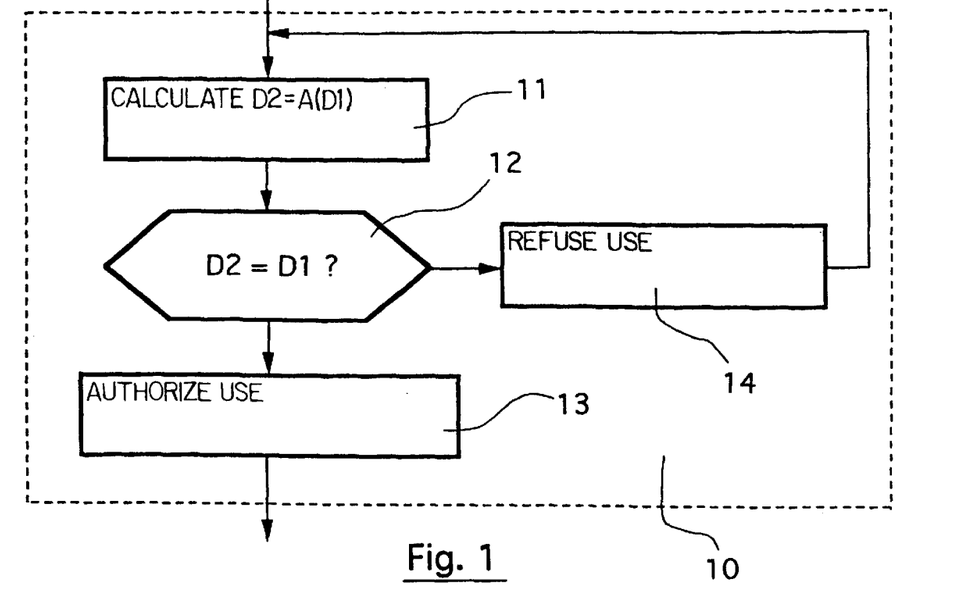
FIG. 1 is used to explain the general principle of the method of the invention, being a simplified flowchart of the terminal/user card link authentication phase.

In the locked mode, the link authentication phase consists in the terminal verifying the user card with which it is cooperating. In accordance with the invention, and as shown in the simplified flowchart of FIG. 1, this authentication phase 10 includes the following steps:

second locking data D2 is calculated (11) in the terminal from intermediate data Di read in a memory area accessible to the terminal and using a calculation function A specific to the terminal, the first locking data D1 and the second locking data D2 are compared (12) in the terminal, and use of the terminal is authorized (13) only in the event of equality, i.e. if the user card with which the terminal is cooperating is authenticated as the linked user card. If not, use of the terminal is refused (14).

The authentication phase 10 is carried out each time the terminal is switched on and each time the user card cooperating with the terminal is changed, for example. It can also be carried out repetitively, in accordance with a predetermined strategy (for example, at regular time intervals during operation in locked mode).

The calculation function A specific to the terminal is an encryption function using a predetermined algorithm, for example, with the result that the first and second locking data D1 and D2 consist of data encrypted by this encryption function A.

Each of the three pairs of FIGS. (2A, 2B), (3A, 3B) and (4A, 4B) shows a different implementation of the authentication phase 10 from FIG. 1.

Figure 2A:
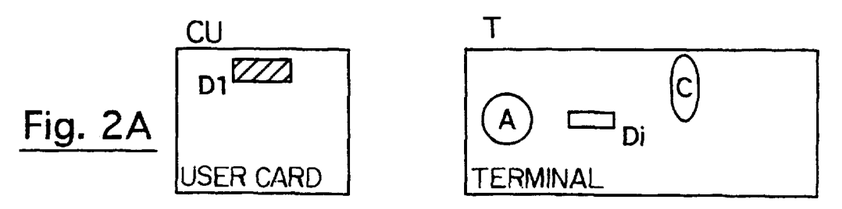
Figure 2B:
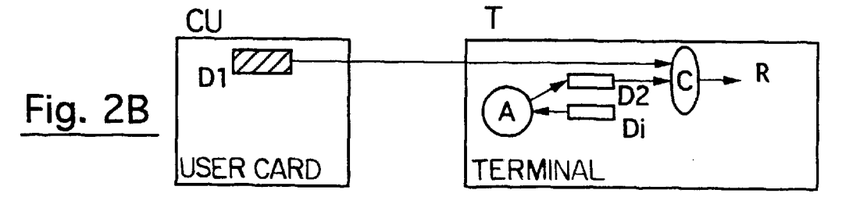
Figure 3A:
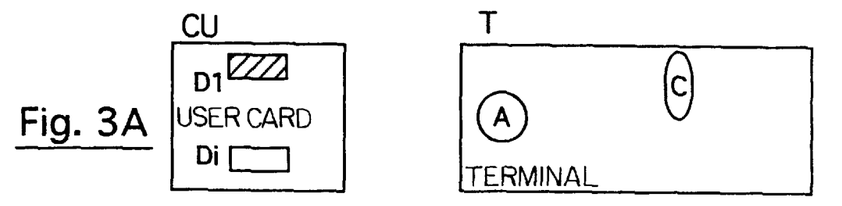
Figure 3B:
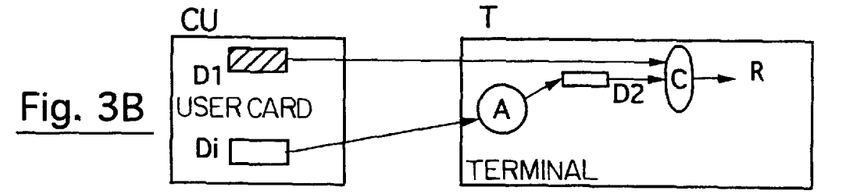
Figure 4A:
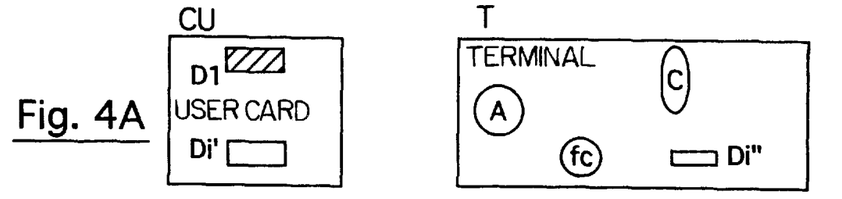

In each pair, the first FIG. 2A, 3A or 4A shows in schematic form the distribution between the terminal T and the user card CU of elements enabling implementation of the method of the invention. These elements include the first locking data D1, the calculation function A specific to the terminal, a comparison function C and the intermediate data Di. By the very nature of the invention, the first locking data D1 is always stored on the linked user card CU. By definition, the calculation function A specific to the terminal and the comparison function C are stored in the terminal T. On the other hand, depending on the technique adopted, the intermediate data Di may be stored in the terminal (see FIGS. 2A and 2B), on the user card CU (see FIGS. 3A and 3B) or divided between the terminal T and the user card CU (see FIGS. 4A and 4B).

Figure 4B:
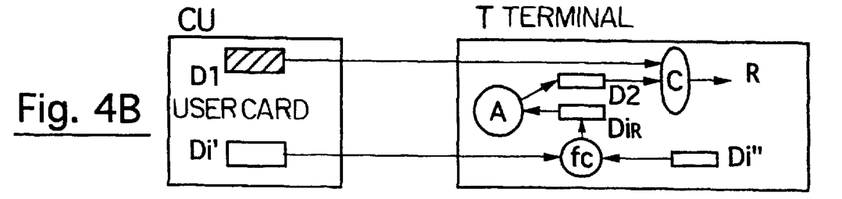

The second FIG. 2B, 3B or 4B shows in schematic form the phase of authentication of the user card CU by the terminal T.

Using a first technique (see FIG. 2A and 2B), the intermediate data Di is stored in a memory area of the terminal T. The link authentication phase is as follows (see FIG. 2B): the terminal reads the first locking data D1 on the user card and compares (C) it to second locking data D2 that it calculates from the intermediate data Di stored in it using the calculation function A. The result R of this comparison authorizes or refuses use of the terminal T.

Using a second technique (see FIGS. 3A and 3B), the intermediate data Di is stored in a memory area of the user card CU with which the terminal T is cooperating. The link authentication phase (see FIG. 3B) is identical to that for the first technique except that the terminal T reads the intermediate data Di from the user card CU.

Using a third technique (see FIGS. 4A and 4B), a portion Di" of the intermediate data Di is stored in a memory area of the terminal T and the remainder Di' is stored in a memory area of the user card CU with which the terminal is cooperating. The link authentication phase (see FIG. 4B) is identical to that for the first technique except that, using a combination function fc, the terminal T combines the intermediate data Di" stored in it and the intermediate data Di' stored on the user card and uses the result DiR of this combination to calculate the second locking data D2 using the calculation function A.

Note that more than one terminal can have the same encryption function. In this case, the authentication phase 10 is preferably executed using the first or third technique described above. Intermediate data Di, Di' stored in a memory area of the terminal but which differ from one terminal to another prevent identical first locking data being stored in user cards linked with different terminals having the same encryption function.

The intermediate data Di, Di', Di" is stored during the manufacture of the device (terminal or user card, as appropriate) in which they are stored, for example.

Figure 5:
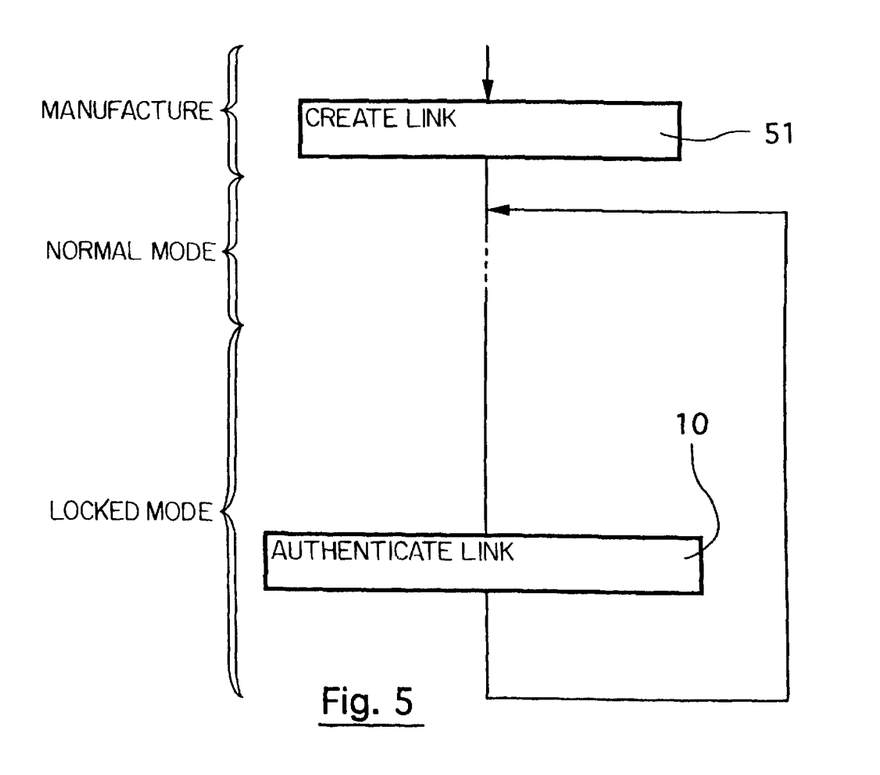
FIG. 5 shows a simplified flowchart of a first embodiment of the method of the invention.

FIG. 5 shows a simplified flowchart of a first embodiment of the method of the invention. The terminal/user card link creation step 51, i.e. the step in which the first locking data D1 is stored in a memory area of the linked user card, is carried out once and for all during personalization of the linked user card (for example, during its manufacture). During operation in locked mode, the link authentication phase 10 is effected as often as necessary. Finally, it is possible to change from the normal mode to the locked mode and vice versa.

Figure 6:
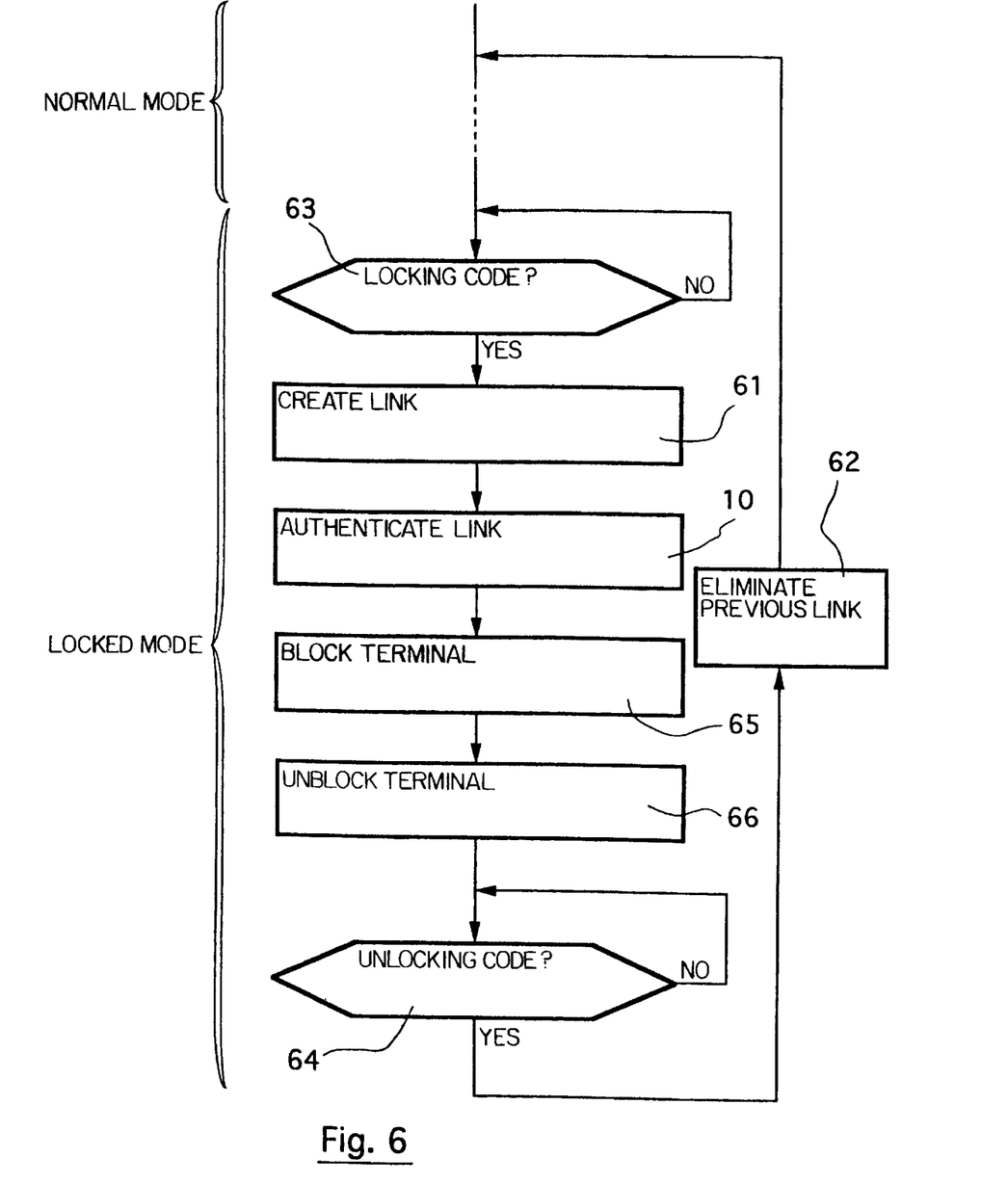
FIG. 6 shows a simplified flowchart of a second embodiment of the method of the invention.

FIG. 6 shows a simplified flowchart of a second embodiment of the method of the invention. The link creation phase 61 is effected on each change from the normal mode to the locked mode.

Figure 7:
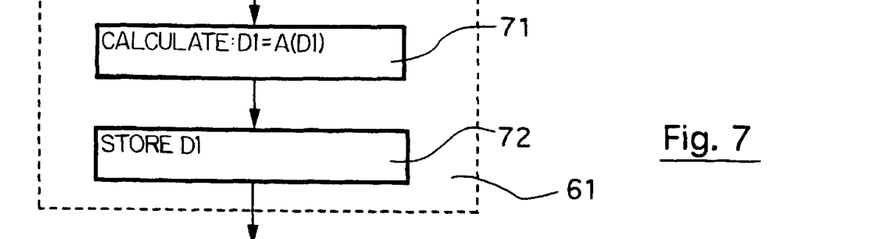
FIG. 7 shows the link creation phase from FIG. 6 in more detail.

FIG. 7 shows the link creation phase 61 in more detail, this phase comprising the following steps:

new first data D1 is calculated (71) in the terminal from the intermediate data Di using the calculation function A specific to the terminal, and the new first locking data D1 is stored (72) in a memory area of the linked user card.

A step 62 may also be executed on each change from the locked mode to the normal mode to eliminate the previous terminal/linked user card link. For this, the content of the memory area of the previously linked user card in which the first locking data is stored is at least partially modified.

The option may be provided of the terminal, whilst remaining in the locked mode with a first linked user card, being usable with at least a second linked user card during a multi-user session. This session, during which the second linked user card is used, begins with the supply to the terminal of a multi-user code and ends either when the second link user card is no longer cooperating with the terminal or when the terminal is switched off and then switched on again. At the end of the session the system reverts to the locked mode with the link between the terminal and the first linked user card.

Various additional steps that the method of the invention may comprise are described next with reference to the second embodiment of the method of the invention shown in FIG. 6. Note that these additional steps may also be added to the first embodiment of the method of the invention shown in FIG. 5.

The input of a predetermined locking/unlocking code may be required (steps 63 and 64) before the terminal can be changed from the normal mode to the locked mode or vice versa. This locking/unlocking code is entered by the subscriber via a keypad connected to their terminal (or integral therewith), for example.

The method may also comprise, in locked mode, a terminal blocking step 65 and a terminal unblocking step 66.

Figure 8:
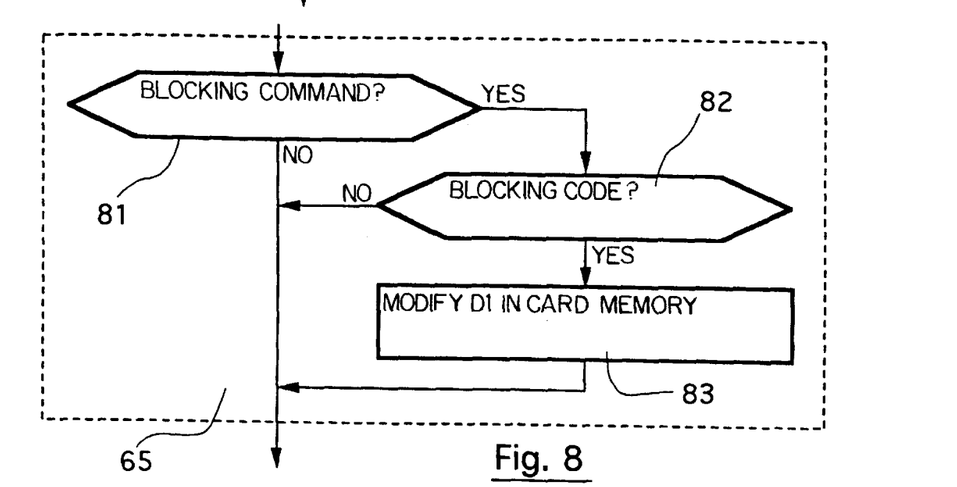
FIG. 8 shows the terminal blocking phase from FIG. 6 in more detail.

FIG. 8 shows the terminal blocking phase in more detail, this phase including a step 83 of at least partial modification of the content of the memory area of the linked user card in which the first locking data D1 is stored. This enables use of the terminal to be prevented even if the user card with which it is cooperating is the linked user card. It is important to note that in this blocked state the terminal remains switched on and can therefore provide answering machine type functions (for example, storing the caller number for an incoming call and/or recording a message left by the caller).

The execution of the blocking step 65 may be conditioned by the following double condition: a blocking command must be transmitted to the terminal (81), and the blocking command must be accompanied by a predetermined blocking/unblocking code (82).

Figure 9:
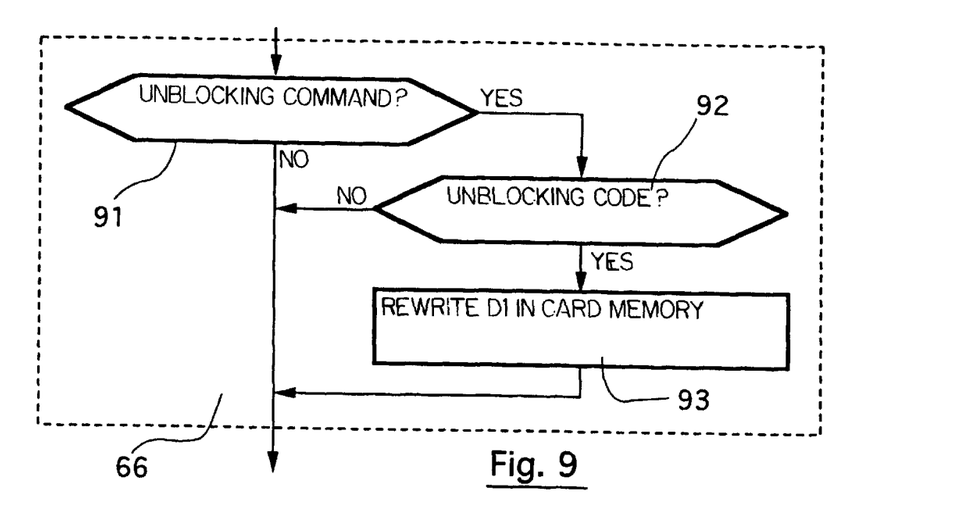
FIG. 9 shows the terminal unblocking phase from FIG. 6 in more detail.

FIG. 9 shows the terminal unblocking phase in more detail, this phase including a step 93 of rewriting the first blocking data D1 into the memory area of the linked user card. This allows use of the terminal to be re-enabled, provided that the user card with which it is cooperating is the linked user card, of course.

The execution of the unblocking step 66 may be conditioned by the following double condition: an unblocking command must be transmitted to the terminal (91) and the unblocking command must be accompanied by a predetermined blocking/unblocking code (92).

Figure 10:
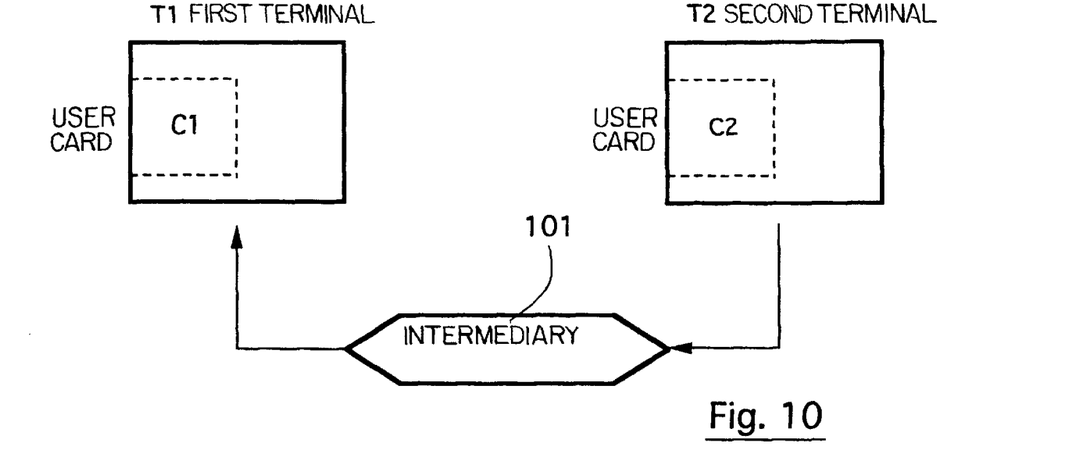
FIG. 10 shows in schematic form a particular embodiment of the method of the invention using two terminals.

As shown in FIG. 10, the blocking and unblocking commands are transmitted to the terminal (constituting a first terminal T1) from another terminal (constituting a second terminal T2) through the intermediary (101) of either a Short Messages Service or a Data Transmission Service, for example. These two services are implemented through techniques defined in GSM recommendations of series 2, 3, 4 and 7. In both cases, the network must include at system level means for routing such blocking and unblocking commands.

Thus a user having two separate user cards C1, C2 (each cooperating with a separate terminal T1, T2) for one and the same subscription may have at all times at least one terminal capable of fulfilling various "passive reception" functions (answering machine type operation).

One example of the use of the method of the invention when the first terminal T1 is a mobile terminal mounted on a vehicle and the second terminal T2 is a portable terminal will now be described.

For a predetermined period, for example during an important meeting, the user may prefer not to receive any calls on their portable terminal, so that they are not disturbed. This user would nevertheless like to know afterwards if anyone has tried to call them during this period of time. This is possible, using the method of the invention, if they carry out the following operations:

they leave their mobile terminal switched on;

they switch their mobile terminal to the locked mode;

they send a blocking command to their mobile terminal from their portable terminal (via the Short Messages Service or the Data Transmission Service);

they switch off their portable terminal.

In this way their mobile terminal can operate as an answering machine, even though it is blocked (i.e. unusable) because the user card no longer contains the first locking data D1.

Afterwards (for example when the meeting is finished), the user carries out the following operations:

they switch on their portable terminal;

from their portable terminal, they send an unblocking command to their mobile terminal.

They can therefore use their mobile terminal normally, in particular to hear any recorded messages or to retrieve the numbers of callers memorized while the mobile terminal was operating as an answering machine.

Figure 11:
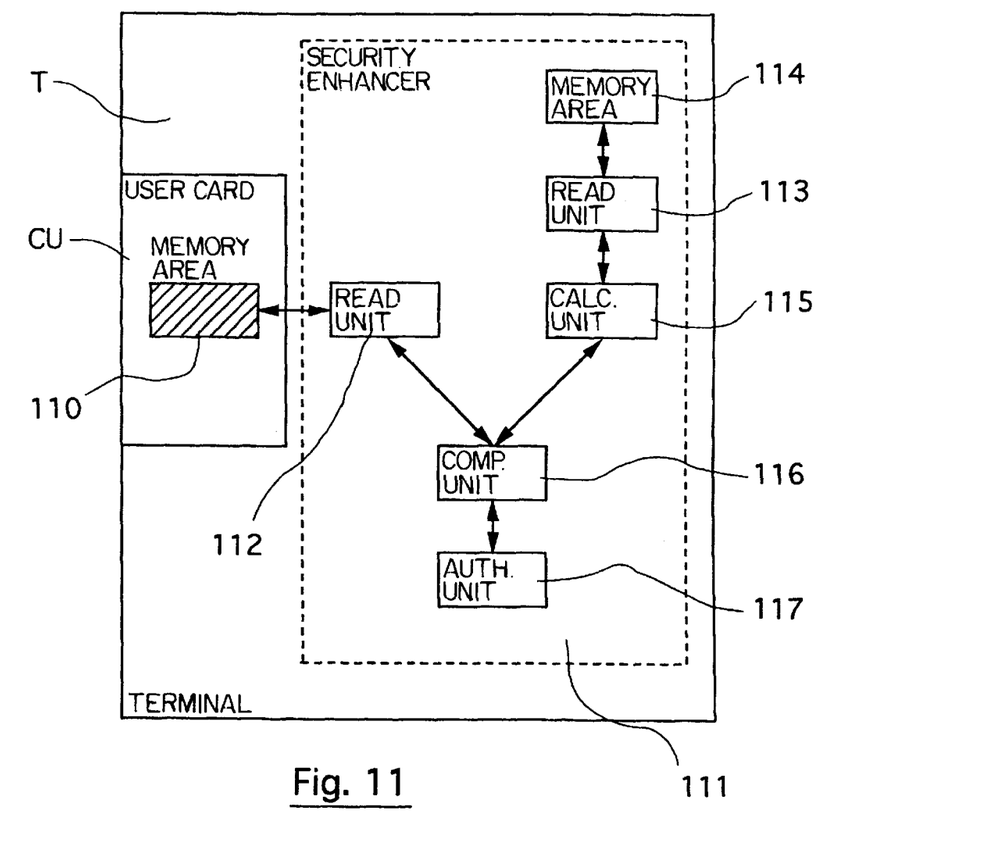
FIG. 11 shows a simplified schematic of a particular embodiment of a terminal and a user card of the invention.

The invention also concerns a terminal and a user card for implementing the method as explained hereinabove. FIG. 11 shows a simplified schematic of one embodiment of the terminal and the user card.

The user card CU has a memory area 110 to receive first locking data D1. The terminal T includes means 111 for making its use more secure including:

first means 112 for reading first locking data D1 in the memory area 110 of the linked user card CU;

second means 113 for reading intermediate data Di in a memory area 114 accessible to the terminal;

means 115 for calculating second locking data D2 from the intermediate Di so read using a calculation function A specific to the terminal;

means 116 for comparing the first and second locking data D1, D2; and selective authorization means 117 enabling use of the terminal only in the event of equality, i.e. if the user card with which the terminal is cooperating is authenticated as the linked user card.

The means 111 are used in the locked mode during the phase 10 of authentication by the terminal T of the user card CU with which it is cooperating (see FIG. 1).

In the embodiment shown in FIG. 11, the intermediate data Di is stored in a memory area 114 of the terminal. The technique by which the authentication phase 1 is implemented is then the first technique described hereinabove, with reference to FIGS. 2A and 2B.

It is clear that the invention is not limited to this particular embodiment but encompasses also the case in which the intermediate data is stored in a memory area of the user card or that in which the intermediate data is divided between the terminal and the user card.

There is claimed:

1. A method of making the use of a terminal of a cellular mobile radio system more secure, said terminal being of the type adapted to cooperate with a user card and being able to operate in at least two separate operating modes, namely a normal mode in which it can be used with any user card and a locked mode in which it can be used only with a particular user card to which it is locked, constituting a linked user card, comprising:

a storing step for storing first locking data in a memory area of said linked user card;

an authentication step by said terminal of the user card with which it is cooperating, occurring in said locked mode, wherein said authentication step further includes the following sub-steps:

calculating second locking data by said terminal from intermediate data read in a memory area accessible to said terminal using a calculation function specific to said terminal, comparing said first and second locking data, and authorizing use of said terminal only when said first and second locking data are equal which indicates that said user card, with which said terminal is cooperating, is authenticated as said linked user card.

2. The method claimed in claim 1 wherein said authentication step is executed:

each time said terminal is switched on, and/or each time said user card cooperating with said terminal is changed.

3. The method claimed in claim 1 wherein said calculation function specific to said terminal is an encryption function using a predetermined algorithm and said first and second locking data consists of data encrypted using said encryption function.

4. The method claimed in claim 1 wherein said storing step of storing first locking data in a memory area of said linked user card is executed during preliminary personalization of said linked user card.

5. The method claimed in claim 1 wherein said storing step of storing first locking data in a memory area of said user card is executed on each change from said normal mode to said locking mode, new first data to be stored being calculated in said terminal from said intermediate data using said calculation function specific to said terminal.

6. The method claimed in claim 5 wherein, on each change from said locked mode to said normal mode, the content of said memory area of the previously linked user card in which said first locking data is stored is at least partially modified to eliminate the authentication link between said terminal and said previously linked user card.

7. The method claimed in claim 5 wherein, in said locked mode, said terminal can be used with at least one other user card, constituting another linked user card, during a multi-user session starting after a multi-user code has been transmitted to said terminal and ending either when said other link user card is no longer cooperating with said terminal or when said terminal is switched off and then switched on again.

8. The method claimed in claim 1 wherein said intermediate data is stored in a memory area of said terminal.

9. The method claimed in claim 1 wherein said intermediate data is stored in a memory area of said user card with which said terminal is cooperating.

10. The method claimed in claim 1 wherein part of said intermediate data is stored in a memory area of said terminal and the remainder of said intermediate data is stored in a memory of said user card with which said terminal is cooperating.

11. The method claimed in claim 8 wherein said step of storing intermediate data is executed:

during manufacture of said terminal, in the case of intermediate data stored in a memory area of said terminal, and during manufacture of said user card, in the case of intermediate data stored in the memory area of said user card.

12. The method claimed in claim 1 wherein changing said terminal from said normal mode to said locked mode requires the transmission to said terminal of a predetermined locking/unlocking code and changing said terminal from said locked mode to said normal mode requires the transmission to said terminal of said locking/unlocking code.

13. The method claimed in claim 12 wherein said locking/unlocking code is entered by a user of said terminal via a keypad connected to said terminal.

14. A method as claimed in claim 1, further including, in said locked mode:

a terminal blocking step during which the content of said memory area of said link user card in which said first locking data is stored is at least partially modified to prevent use of said terminal even when said user card with which it is cooperating is said linked user card, and a terminal unblocking step during which said first locking data is rewritten into said memory area of said linked user card to allow use of said terminal when said user card with which it is cooperating is said linked user card.

15. The method claimed in claim 14 wherein said blocking step is executed when a blocking command is transmitted to said terminal and said unblocking step is executed when an unblocking command is transmitted to said terminal.

16. The method claimed in claim 15 wherein said blocking and unblocking command are ignored by said terminal unless they are accompanied by a predetermined blocking/unblocking code.

17. The method claimed in claim 15 wherein said blocking and unblocking commands are transmitted to said terminal by means of a Short Messages Service.

18. The method claimed in claim 15 wherein said blocking and unblocking commands are transmitted to said terminal by means of a Data Transmission Service.

19. The method claimed in claim 15 wherein said blocking and unblocking commands are transmitted to said terminal, constituting a first terminal, from another terminal constituting a second terminal, and said user card with which said second terminal is cooperating and said user card with which said first terminal is cooperating correspond to the same subscription.

20. A terminal for a cellular mobile radio system, said terminal being of the type adapted to cooperate with a user card and being able to operate in at least two different operating modes, namely a normal mode in which it can be used with any user card and a locked mode in which it can be used only with the user card to which it has been locked, constituting a linked user card, said terminal including means for making its use more secure including:

first means for reading first locking data in a memory area of said user card, second means for reading intermediate data in a memory area accessible to said terminal, means for calculating second locking data from said intermediate data using a calculation function specific to said terminal, means for comparing said first and second locking data, and selective authorization means enabling use of said terminal only in the event of equality, that is to say if the user card with which said terminal is cooperating is authenticated as said linked user card, said means for making use of said terminal more secure being used, in said locked mode, during a phase of authentication by said terminal of said user card with which it is cooperating.

21. A user card of the type adapted to cooperate with a terminal of a cellular mobile radio system, said terminal being able to operate in at least two separate operating modes, that it to say a normal mode in which it can be used with said user card or with any other user card of the same type and a locked mode in which it can be used only with said user card if it has been locked to said user card, constituting a linked user card in this case, said user card having a memory area to receive first locking data and said first locking data being used, in said locked mode, during a phase of authentication by said terminal of said user card with which it is cooperating, said authentication phase consisting in said terminal calculating second locking data and comparing it with said first locking data in order to authorize use of said terminal only in the event of equality.

* * * * *